(12) United States Patent
Suzuki et al.

(10) Patent No.: US 12,535,480 B2
(45) Date of Patent: Jan. 27, 2026

(54) PARTICLE, AFFINITY PARTICLE, AND REAGENT, KIT AND DETECTION METHOD CONTAINING THE SAME

(71) Applicants: CANON KABUSHIKI KAISHA, Tokyo (JP); CANON MEDICAL SYSTEMS CORPORATION, Tochigi (JP)

(72) Inventors: Masao Suzuki, Kawasaki (JP); Kazumichi Nakahama, Tokyo (JP); Sakae Suda, Yokohama (JP); Keiichiro Tsubaki, Tokyo (JP); Kengo Kanazaki, Yokohama (JP); Ryo Natori, Tokyo (JP); Fumio Yamauchi, Yokohama (JP)

(73) Assignees: Canon Kabushiki Kaisha, Tokyo (JP); Canon Medical Systems Corporation, Tochigi (JP)

( * ) Notice: Subject to any disclaimer, the term of this patent is extended or adjusted under 35 U.S.C. 154(b) by 1060 days.

(21) Appl. No.: 16/986,649

(22) Filed: Aug. 6, 2020

(65) Prior Publication Data

US 2021/0055286 A1 Feb. 25, 2021

(30) Foreign Application Priority Data

Aug. 23, 2019 (JP) ................. 2019-153211

(51) Int. Cl.
| | |
|---|---|
| *G01N 33/543* | (2006.01) |
| *C08F 8/14* | (2006.01) |
| *C08F 8/32* | (2006.01) |
| *C08F 220/32* | (2006.01) |
| *G01N 33/53* | (2006.01) |
| *G01N 33/545* | (2006.01) |

(52) U.S. Cl.
CPC ....... *G01N 33/545* (2013.01); *C08F 220/325* (2020.02); *G01N 33/5306* (2013.01)

(58) Field of Classification Search
CPC ............ G01N 33/545; G01N 33/5306; G01N 33/54393; C08F 220/325; C08F 8/14; C08F 8/32
See application file for complete search history.

(56) References Cited

U.S. PATENT DOCUMENTS

| | | | |
|---|---|---|---|
| 5,986,072 | A | 11/1999 | Handa et al. |
| 6,545,132 | B1 | 4/2003 | Handa et al. |
| 6,703,207 | B2 | 3/2004 | Handa et al. |
| 12,111,311 | B2 * | 10/2024 | Suda ................ G01N 33/54313 |
| 2002/0160472 | A1 | 10/2002 | Handa et al. |
| 2021/0055292 | A1 | 2/2021 | Suda et al. |
| 2022/0163535 | A1 * | 5/2022 | Natori .............. G01N 33/54353 |

FOREIGN PATENT DOCUMENTS

| | | | |
|---|---|---|---|
| CA | 2542326 | * | 4/2006 |
| JP | 2000-351814 A | | 12/2000 |
| JP | 2005-232237 A | | 9/2005 |
| WO | 2021/039982 A1 | | 3/2021 |

OTHER PUBLICATIONS

Koubkova et al. ("Magnetic poly(glycidyl methacrylate) microspheres for protein capture", New Biotechnology, vol. 31, #5, published Sep. 2014). (Year: 2014).*
Mazlan et al. ("Facile Synthesis of Magnetic Copolymer Microspheres Based on Poly(glycidylmethacrylate-co-N-isopropylacrylamide)/Fe3O4 by Suspension Photopolymerization", International Journal of Polymer Science, vol. 2014, pp. 1-7, published Jul. 3, 2014) (Year: 2014).*
Ma et al. ("Synthesis of monodisperse nonporous crosslinked poly(glycidyl methacrylate) particles with metal affinity ligands for protein adsorption", Society of Chemical Industry. Polym Int., vol. 54, pp. 1502-1507, published 2005). (Year: 2005).*
Mishra et al. ("Synthesis and Characterization of Butyl Acrylate/Methyl Methacrylate/Glycidyl Methacrylate Latexes", Journal of Applied Polymer Science, vol. 115, pp. 549-557, published 2010). (Year: 2010).*
Clogston et al., "Physicochemical Characterization of Polymer Nanoparticles: Challenges and Present Limitations" Vauthier and G. Ponchel (eds), Polymer Nanoparticles for nanomedicines, Sringer, pp. 187-203, published 2016. (Year: 2016).*
Suda et al., U.S. Appl. No. 16/986,662, filed Aug. 6, 2020.
Natori et al., U.S. Appl. No. 17/667,823, filed Feb. 9, 2022.
Non-final Office Action in U.S. Appl. No. 16/986,662 (Nov. 2023).
Notice of Allowance in U.S. Appl. No. 16/986,662 (Jul. 2024).
Final Office Action in U.S. Appl. No. 16/986,662 (Mar. 2024).

* cited by examiner

*Primary Examiner* — Shafiqul Haq
*Assistant Examiner* — Nam P Nguyen
(74) *Attorney, Agent, or Firm* — Venable LLP

(57) ABSTRACT

The present invention provides a particle that shows a small non-specific adsorption, has a reactive functional group for chemically bonding a ligand thereto, and is suitable for an agglutination method. The particle includes a polymer having a unit having a side chain A and a unit having a side chain B, wherein the side chain A has a carboxyl group at a terminal thereof, and has an ester bond and an amide bond in a molecular structure thereof; the side chain B has an alkyl group at a terminal thereof; and a zeta potential at the time when the particles are dispersed in water is minus 40 mV or higher and minus 5 mV or lower.

13 Claims, No Drawings

PARTICLE, AFFINITY PARTICLE, AND REAGENT, KIT AND DETECTION METHOD CONTAINING THE SAME

BACKGROUND OF THE INVENTION

Field of the Invention

The present invention relates to: a particle; an (affinity) particle for an agglutination method having a ligand for a target substance bonded thereto; and a reagent, a kit and a method for detecting a target substance, each for in vitro diagnosis, each of which contains the particle.

Description of the Related Art

As a simple and rapid immunoassay method, agglutination methods, inter alia, a latex agglutination method, can be mentioned. In this method, a dispersion liquid of particles for the latex agglutination method, which are each chemically bonded to a ligand having affinity for a target substance, is mixed with a specimen that possibly contains the target substance.

At this time, if the target substance is contained in the specimen, the particles for the latex agglutination method cause an agglutination reaction, and accordingly, the presence or absence of a disease can be identified by optically detecting the agglutination reaction as amounts of changes in an intensity of scattered light, an intensity of transmitted light, an absorbance and the like.

In general, an antibody and an antigen, or an antigen and an antibody are used for a combination of a ligand and a target substance. It is desired for a particle constituting the particles for the latex agglutination method that a characteristic of adsorbing a substance other than the target substance is small, which is so-called non-specific adsorption, for the purpose of not causing a non-specific agglutination reaction that does not originate from the target substance.

As a procedure for reducing the non-specific adsorption of the particle, there is a method of coating a surface of the particle with a biologically-derived substance such as albumin, casein and gelatin. However, there is the case where the physical properties of these biologically-derived substances are different depending on each production lot, and in addition, opinions are also heard that there are concerns about future biological contamination due to the use thereof in large quantities.

A procedure of coating the surface of the particle with an amphiphilic polymer compound is also effective as a method for reducing the non-specific adsorption, but the adsorption of the polymer compound to the particle originates in physical adsorption, and accordingly, there is a possibility that the particle may be liberated due to dilution; and sometimes the non-specific adsorption cannot be suppressed sufficiently.

In Bioseparation using affinity latex (1995) p 11 to p 30, a particle is disclosed which has polyglycidyl methacrylate arranged on the surface. It is known that the polyglycidyl methacrylate arranged on the surface of the particle shows a glycol by a part of the glycidyl group being opened, and thereby suppresses the non-specific adsorption.

In addition, in Japanese Patent Application Laid-Open No. 2000-351814 and Japanese Patent Application Laid-Open No. 2005-232237, a particle is disclosed which has been synthesized to have a unit having a side chain having a glycidyl group, and to chemically modify the above glycidyl group, and in which thereby the side chain length is long and a reactive functional group or a ligand is chemically bonded to a terminal of the side chain.

When the present inventors chemically bonded a ligand to the particle which is described in the Bioseparation using affinity latex (1995) p 11 to p 30, sufficient dispersion stability could not be guaranteed in many general aqueous buffer solutions, and it was difficult to use the particle as the particles for the agglutination method. On the other hand, when the present inventors attempted to chemically bond a ligand to a particle which was synthesized according to Japanese Patent Application Laid-Open No. 2000-351814 and to use the particle as the particle for the agglutination method, the non-specific adsorption was surprisingly suppressed, but the dispersion stability was excessively excellent, and accordingly sufficient aggregation reaction could not be observed in some cases. The reason why the particle described in Japanese Patent Application Laid-Open No. 2000-351814 is superior in dispersion stability to the particle described in Bioseparation using affinity latex (1995) p 11 to p 30 is considered to be caused by an exclusion volume effect between the particles, which originates in that the side chain length is long.

The present invention has been made in view of these background arts and problems. An object of the present invention is to provide a particle that shows a small non-specific adsorption, has a reactive functional group for chemically bonding a ligand thereto, and is suitable for an agglutination method; an (affinity) particle for an agglutination method having a ligand chemically bonded to the particle; a reagent and a kit containing the particle; and a method for detecting a target substance using the same.

SUMMARY OF THE INVENTION

Specifically, a first aspect of the present invention is a particle including a polymer having a unit having a side chain A and a unit having a side chain B, wherein the side chain A has a carboxyl group at a terminal thereof, and has an ester bond and an amide bond in a molecular structure thereof; the side chain B has an alkyl group at a terminal thereof; and a zeta potential at the time when the particles are dispersed in water is minus 40 mV or higher and minus 5 mV or lower.

A second aspect of the present invention is an (affinity) particle for an agglutination method having a ligand chemically bonded to the particle via a side chain A of the particle.

Furthermore, a third aspect of the present invention is a reagent for use in detecting a target substance in a specimen by in vitro diagnosis, including the particle for the agglutination method; a kit for use in detecting the target substance in the specimen by in vitro diagnosis, including at least the reagent; and a method for detecting the target substance, including mixing the particles for the agglutination method with the specimen that possibly contains the target substance.

Further features of the present invention will become apparent from the following description of exemplary embodiments.

DESCRIPTION OF THE EMBODIMENTS

Preferred embodiments of the present invention will now be described in detail.

Embodiments of the present invention will be described below in detail, but the technical scope of the present invention is not limited to these embodiments.

A particle of the present invention is a particle including a polymer having a unit having a side chain A and a unit having a side chain B, wherein the side chain A has a carboxyl group at a terminal thereof, and has an ester bond and an amide bond in a molecular structure thereof; the side chain B has an alkyl group at a terminal thereof; and a zeta potential at the time when the particles are dispersed in water is minus 40 mV or higher and minus 5 mV or lower. It is preferable that the carboxyl group and the alkyl group exist on a surface of the particle. Here, the "unit" means a unit structure which corresponds to one monomer.

In the present invention, the carboxyl group that the side chain A has at its terminal generates an electrostatic repulsion force which depends on its chargeability, and thereby plays a role of maintaining dispersion stability when an aqueous dispersion liquid containing the particles has been prepared.

It has been clarified from the studies of the present inventors that when the chargeability is too small, the carboxyl group works disadvantageously for the maintenance of the dispersion stability of the dispersion liquid, and when the chargeability is too large, the carboxyl group shows a tendency of working disadvantageously for reactivity of the agglutination, when the particle of the present invention has been applied as particles for the agglutination method, and that the reactivity of the agglutination shows a maximum value in a certain range.

Specifically, the zeta potential at the time when the particles of the present invention are dispersed in water is from minus 40 mV or higher and minus 5 mV or lower, and is more preferably minus 35 mV or higher and minus 10 mV or lower.

For information, the above zeta potential is a value which is measured under the following conditions.

Dynamic light scattering particle size measuring machine: ZETASIZER NANO ZS (manufactured by Malvern Panalytical)
Concentration of solid content: 0.01% by mass
Measurement temperature: 25° C.
Medium of dispersion liquid: ultrapure water
Measuring cell: DTS1070
Specification of laser: He—Ne, 4 mW and 633 nm
Optical system for detection: NIBS, 173° C.
Number of integrations: 20 times
Isothermalization time period: 5 minutes
Analysis method: Smoluchowski formula
Calculation method: measured 5 times, an average value of values excluding the maximum value and the minimum value.

In the present invention, the carboxyl group that the side chain A has at its terminal plays a role of chemically bonding a ligand thereto. When the concentration of the carboxyl group on the surface of the particle is small, the chemical reaction efficiency at the time when the ligand is chemically bonded becomes low, and when affinity particles which are obtained as a result are used as particles for the agglutination, the affinity particles work disadvantageously for the agglutination reactivity. On the other hand, when the concentration of the carboxyl group on the surface of the particle is excessively high, there is a risk that the ligands result in being excessively chemically bonded, and when the affinity particles obtained as a result are used as the particles for the agglutination method, the mobility of the ligand results in being restricted, and the affinity particles show a tendency of working disadvantageously for the agglutination reactivity. These facts have been clarified from studies of the present inventors, and it has been known that when the particle of the present invention is used as the particles for the agglutination method, the agglutination reactivity exhibits a maximum value with respect to the concentration of the carboxyl group on the surface of the particle.

Specifically, it is preferable for the unit having the side chain A and the unit having the side chain B to satisfy the relationship of Expression (1), and is more preferable to satisfy the relationship of Expression (1)'.

10≤[Number of units having side chain A]/[[Number of units having side chain A]+[Number of units having side chain B]]×100≤50       Expression (1)

20≤[Number of units having side chain A]/[[Number of units having side chain A]+[Number of units having side chain B]]×100≤30       Expression (1)'

When the particles of the present invention are stored as an aqueous dispersion liquid in a state in which the dispersion stability is maintained, it is advantageous for the carboxyl group that the side chain A has at its terminal of the present invention to be neutralized by a metal salt such as a sodium salt or a potassium salt, or an organic salt such as an ammonium salt. In the case where the chemical reactivity at the time when a ligand is chemically bonded to the carboxyl group that the side chain A has at its terminal is taken into consideration, it is more preferable to neutralize the carboxyl group with an organic salt. Examples of the chemical compound which forms the organic salt of the carboxyl group include ammonia, diethylamine, triethylamine, ethanolamine and diethylamino ethanol, but the present invention is not limited to the examples. Considering experimental operability such as a boiling point and solubility in various solvents, triethylamine is easy to use. The salts that neutralize the carboxyl group may be used alone or in combination of two or more types, in a range in which the object of the present invention can be achieved.

The side chain A of the present invention has an ester bond and an amide bond in the molecular structure thereof. This relates to a capability of the particles of the present invention, which suppresses the non-specific adsorption. Although not always being the case, the capability of the particle, which suppresses the non-specific adsorption, correlates with the hydrophilicity of the surface of the particle to some extent, and the more hydrophilic the particle is, the more easily the particle tends to suppress the non-specific adsorption. According to studies by the present inventors, it has been revealed that an ester bond and an amide bond are chemical structures advantageous for imparting a hydrophilic tendency to the side chain, and due to the side chain A having these bonds simultaneously, the particle having the side chain A of the present invention surprisingly suppresses the non-specific adsorption.

It is preferable that the side chain A of the present invention has a partial structure represented by the following Formula (2) in the molecular structure thereof, in addition to the ester bond and the amide bond:

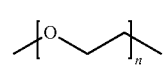

Formula (2)

wherein n is an integer.

In Formula (2), n is an integer. The ester bond and the amide bond are each a rigid structure that does not cause a rotation of the bond between atoms. On the other hand, in the partial structure represented by Formula (2), the bond between atoms freely rotates, and accordingly, the present inventors consider that due to the side chain A having the partial structure of Formula (2), the mobility of the side chain A is improved, which contributes to enhancing the efficiency of the chemical reaction when the carboxyl group of the side chain A at the terminal is chemically bonded to the ligand.

When the unit having the side chain A of the present invention is represented by the following Formula (7), it is preferable that a sum of bonds between atoms, which linearly connect X1 and X2, is 18 or more and 24 or less, and that X1 is $CH_2$, and X2 is CH or $CH_2$. Here, the bond means a bond connecting the atoms. In addition, the sum of bonds between atoms, which linearly connect X1 and X2, is the sum of the number of bonds that connect the atoms. For example, when the number of atoms which linearly connect X1 and X2 is 17, the number of bonds is 18, and when the number of atoms is 23, the number of bonds is 24. Examples of the atom include a carbon atom, an oxygen atom and a nitrogen atom.

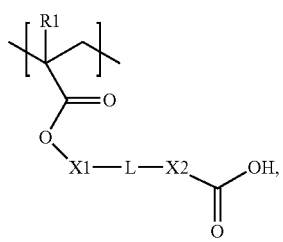

Formula (7)

wherein L is a partial structure having a plurality of interatomic bonds. R1 is H or $CH_3$.

In Formula (7), L is a partial structure having a plurality of interatomic bonds. When the sum of bonds between atoms is smaller than 18, the dispersion stability of the particles is excessively excellent based on the same mechanism as that in the case where the particles described in Japanese Patent Application Laid-Open No. 2000-351814 are used as particles for the agglutination method, and accordingly, there is a possibility that the particles work disadvantageously for causing the agglutination reaction. On the other hand, in the case where the sum of bonds between atoms is 18 or more and 24 or less, it has been known from the studies by the present inventors that an extremely satisfactory agglutination reaction occurs when the particles of the present invention are used as the particles for the agglutination, though the dispersion stability of the particles is excellent. The present inventors consider that the side chain length of the side chain A becomes longer than that of Japanese Patent Application Laid-Open No. 2000-351814, which thereby contributes to that the mobility of the carboxyl group which the side chain A has at its terminal increases in the dispersion medium, the chemical reactivity between the carboxyl group and the ligand is improved, and the reactivity between the ligand and the target substance is improved for the same reason. On the other hand, the present inventors have confirmed by an experiment that when the sum of bonds between atoms is larger than 24, there is a concern that an undesirable phenomenon may occur as the particles for the agglutination. The latex agglutination method in an immunoassay is a method of mixing an aqueous dispersion liquid of particles to which ligands are chemically bonded (hereinafter referred to as "P liquid") with a specimen that possibly contains a target substance (hereinafter referred to as "Q liquid"), and optically detecting the interparticle agglutination which occurs based on a reaction between the ligand and the target substance. The inventors have considered that when the sum of the interatomic bonds is larger than 24, the side chain A increases a tendency of embracing (solvating) a dispersion medium of the dispersion liquid thereinto, and accordingly, the non-specific interparticle agglutination tends to be easily induced which is not based on the reaction between the ligand and the target substance, due to an influence of an osmotic pressure difference which occurs when the P liquid and the Q liquid have been mixed.

When the unit having the side chain A of the present invention is represented by Formula (7), it is preferable that a value of a hydrogen bonding term (hereinafter δh) of the Hansen solubility parameter is in a range of 8.3 or larger and 10.5 or smaller, which is calculated when X1 and X2 in X1-L-X2 are substituted with $CH_3$ groups. As the value of δh becomes smaller, the side chain A shows the tendency of hydrophobicity, and as the value becomes larger, the side chain A shows the tendency of hydrophilicity. When the value of δh is smaller than 8.3, there is a possibility that the ligands are denatured with time in the particles for the agglutination method, to each of which the ligand is chemically bonded via the side chain A, and the denaturation exerts an influence upon the reactivity between the ligand and the target substance. On the other hand, when the value of δh is larger than 10.5, the dispersion stability of the particles in the aqueous dispersion liquid is enhanced, and accordingly, there is the case where interparticle agglutination becomes less likely to occur in the particles for the agglutination method, to each of which a ligand is chemically bonded via the side chain A. The value of δh in the present invention is a value that is calculated with the use of software (Soft Name: HAnsen Solubility PArAmeter in rActice; HSPiP ver.5.0.0.4) which has been developed by Hansen et al. When an estimation method using a neural network method called Y-MB is applied to the above software, and a molecular structure is input by the Smiles formula which is a molecular input line entry system, the molecule is automatically decomposed into atomic groups, and the value of δh is calculated which is a constituent component of the Hansen solubility parameter. For information, in the present invention, the temperature condition for calculating δh is 25° C.

When the unit having the side chain A of the present invention is represented by Formula (7), it is preferable that X1-L-X2 has a partial structure represented by the following Formula (8) or the following Formula (9). When the side chain A does not have the structure represented by Formula (8) or Formula (9), in other words, when the side chain A has a branched structure, an area occupied by one side chain A in the surface of the particle becomes large, due to the exclusion volume effect of the side chains A adjacent to each other. This fact suggests that when the side chain A and the ligand are chemically bonded, there is the case where the amount of chemical bonds of the ligands per particle becomes small.

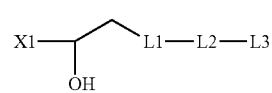

Formula (8)

-continued

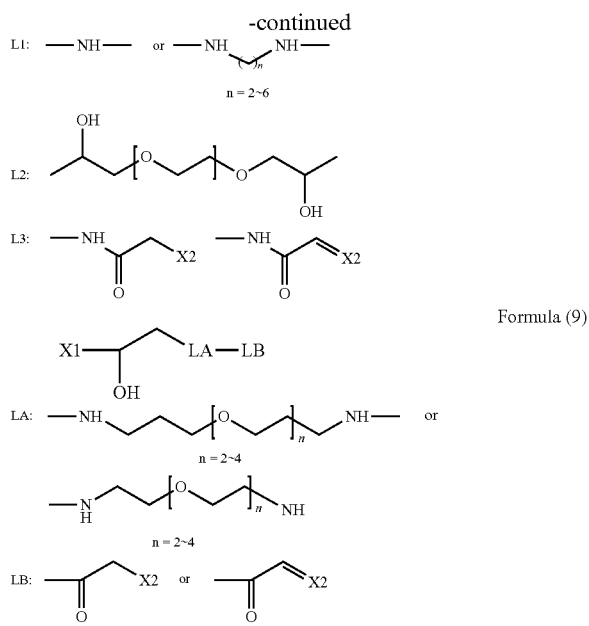

When the unit having the side chain A of the present invention is represented by Formula (7), it is preferable that X1-L-X2 has a nitrogen atom derived from an amine and the number of the above nitrogen atoms is 2 or less. It is qualitatively obvious for the purpose of suppressing the non-specific adsorption that the side chain A is more preferable as the side chain A is closer to electrical neutrality. From this viewpoint, the present inventors have studied, and as a result, it has been known that when the number of nitrogen atoms at least derived from an amine is 2 or less, there is no significant concern against the non-specific adsorption. The case where the number of nitrogen atoms derived from the amine contained in X1-L-X2 is larger than 2 has not been examined, and the contribution to the non-specific adsorption is not clarified.

When the unit having the side chain A of the present invention is represented by Formula (7), it is clarified by studies of the present inventors that it is most preferable that X1-L-X2 is any of the following structure A and the following structure B. The mechanism is as discussed above, and the present inventors conclude that in a particle having a unit having a side chain A having the structure A or the structure B as a partial structure, the balance of various physical properties is optimized.

structure thereof. This structure relates to the capability of the particles of the present invention, which suppresses the non-specific adsorption. Although not always being the case, the capability of the particle, which suppresses the non-specific adsorption, correlates with the hydrophilicity of the surface of the particle to some extent, and the more hydrophilic the particle is, the more easily the particle tends to suppress the non-specific adsorption. According to studies of the present inventors, the ester bond and the amide bond are chemical structures advantageous for imparting the hydrophilic tendency to the side chain, and by having the bonds simultaneously, the side chain B of the present invention contributes to the capability of suppressing the non-specific adsorption of the particles of the present invention.

It is preferable that the side chain B of the present invention has a partial structure represented by Formula (2) in the molecular structure thereof, in addition to the ester bond and the amide bond.

The ester bond and the amide bond are each a rigid structure that does not cause a rotation of the bond between atoms. On the other hand, in the partial structure represented by Formula (2), the bond between atoms freely rotates; and accordingly, due to the side chain A having a partial structure of Formula (2), the mobility of the side chain B is improved, and an exclusion volume effect (interparticle repulsion*steric repulsion effect) is generated when the particles of the present invention are used as an aqueous dispersion liquid, which contribute to improvement of the dispersion stability of the above aqueous dispersion liquid.

It is preferable for the particle of the present invention to contain a repeating unit derived from glycidyl (meth)acrylate, and is more preferable to further contain a repeating unit of a styrene-based monomer. When the particles of the present invention are purified by a method such as centrifugal separation or ultrafiltration, it contributes to suppressing damage such as cracking of the particle that the particle has the repeating unit of the styrene-based monomer which has a high glass transition temperature and is excellent in a mechanical strength. Examples of the styrene-based monomers of the present invention include styrene, α-methylstyrene, β-methylstyrene, o-methylstyrene, m-methylstyrene, p-methylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene and p-phenylstyrene; but are not limited to these chemical compounds in a range in which the object of the present invention can be achieved. In addition, two or more types of styrene-based monomers may be used in combination. It is preferable that the content of the styrene-based monomer is 10 parts by mass or more and 70 parts by mass or less when the mass of the particles is supposed to be

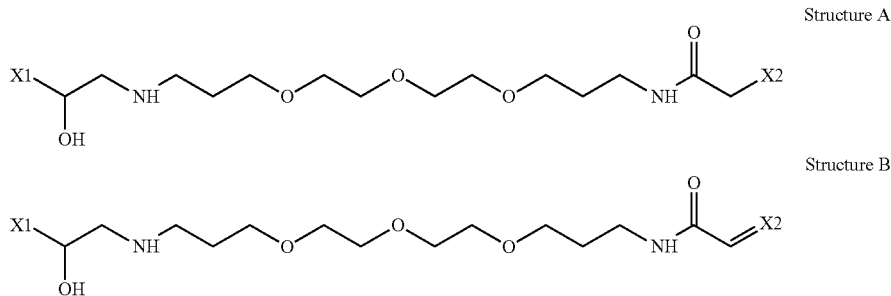

The side chain B of the present invention includes an alkyl group at its terminal, and it is preferable that the side chain B has an ester bond and an amide bond in the molecular 100 parts by mass, because a sufficient strength can be imparted to the particle while maintaining the capability of suppressing the non-specific adsorption.

The particle of the present invention can further contain a repeating unit derived from a radical polymerizable monomer having crosslinking properties. Examples of the radical polymerizable monomer having the crosslinking properties include diethylene glycol diacrylate, triethylene glycol diacrylate, tetraethylene glycol diacrylate, polyethylene glycol diacrylate, 1,6-hexanediol diacrylate, neopentyl glycol diacrylate, tripropylene glycol diacrylate, polypropylene glycol diacrylate, 2,2'-bis(4-(acryloxy diethoxy)phenyl) propane, trimethylolpropane triacrylate, tetramethylolmethane tetraacrylate, ethylene glycol dimethacrylate, diethylene glycol dimethacrylate, triethylene glycol dimethacrylate, tetraethylene glycol dimethacrylate, polyethylene glycol dimethacrylate, 1,3-butylene glycol dimethacrylate, 1,6-hexanediol dimethacrylate, neopentyl glycol dimethacrylate, polypropylene glycol dimethacrylate, 2,2'-bis(4-(methacryloxy diethoxy)phenyl) propane, 2,2'-bis(4-(methacryloxy polyethoxy)phenyl) propane, trimethylolpropane trimethacrylate, tetramethylolmethane tetra methacrylate, divinylbenzene, divinyl naphthalene and divinyl ether; but are not limited to these chemical compounds in a range in which the object of the present invention can be achieved. In addition, two or more types of radical polymerizable monomers having the crosslinking properties may be used in combination.

It is preferable for the particle sizes of the particles of the present invention to be 0.05 μm or larger and 1 μm or smaller, in terms of the number average particle size, is more preferable to be 0.10 μm or larger and 0.50 μm or smaller, and is further preferable to be 0.15 μm or larger and 0.30 μm or smaller. When the number average particle size is 0.15 μm or larger and 0.30 μm or smaller, the particles are excellent in workability in centrifugal separation, and are also excellent in that precipitation of particles is less likely to occur when particles are stored as a dispersion liquid for a long period of time.

The particle size of the particles of the present invention is a value measured under the following conditions.

Dynamic light scattering particle size measuring machine: ZETASIZER NANO ZS (manufactured by Malvern Panalytical)
Concentration of solid content: 0.01% by mass
Measurement temperature: 25° C.
Medium of dispersion liquid: Ultrapure water (produced by Nihon Millipore K.K.)
Measuring cell: GlAss Cuvette
Specification of laser: He—Ne, 4 mW and 633 nm
Optical system for detection: NIBS, 173° C.
Number of integrations: 20 times
Isothermalization time period: 5 minutes
Analysis method: GenerAl Purpose Mode (cumulant method)
Calculation method: measured 5 times, an average value of values excluding the maximum value and the minimum value.

The method of producing the particles of the present invention is not limited in a range in which the object of the present invention can be achieved. For example, the particle can be obtained by a method of firstly producing a mother particle having a repeating unit derived from glycidyl (meth) acrylate on the surface thereof, and then chemically modifying a glycidyl group on the surface of the mother particle.

The above method of chemical modification is not particularly limited in a range in which the object of the present invention can be achieved, but for example, in the case of producing a particle having a unit having the side chain A having the partial structure X1-L-X2 of Formula (8), which is one of exemplary embodiments of the present invention, a reaction scheme of chemical modification such as the following reaction formulae (a) to (d) can be applied.

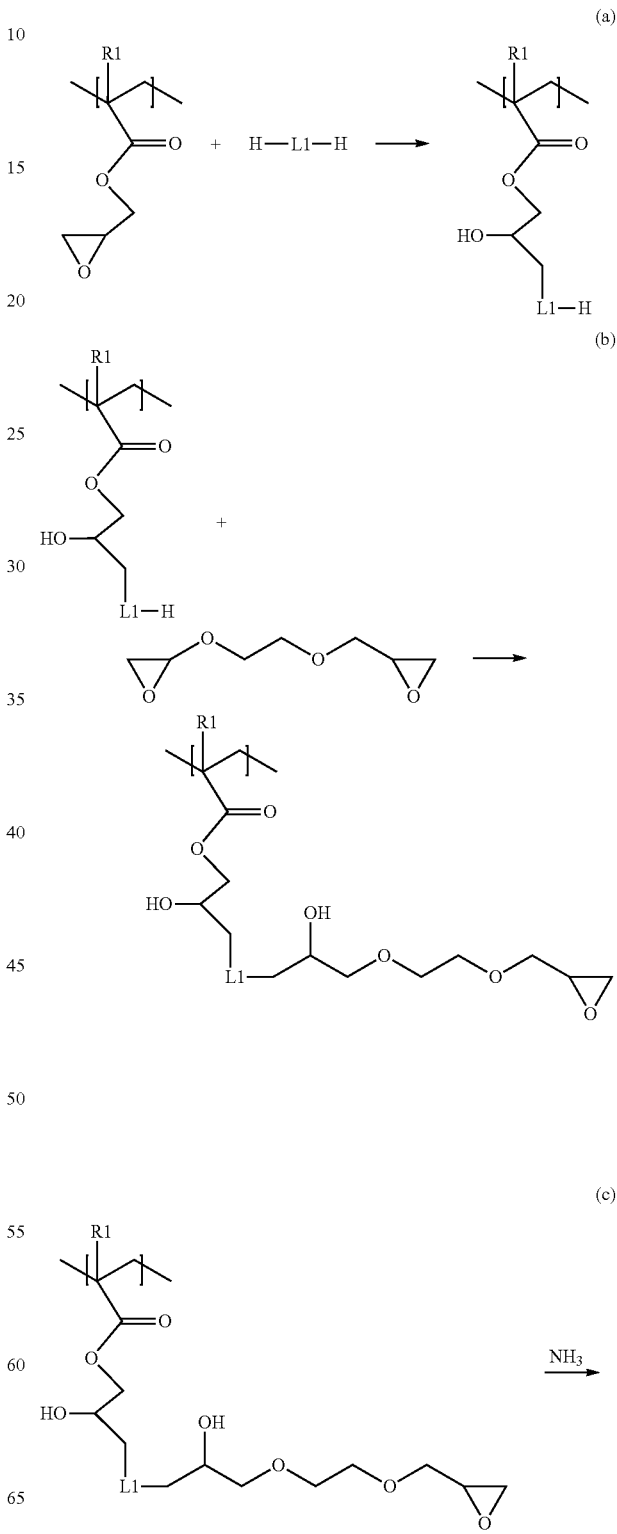

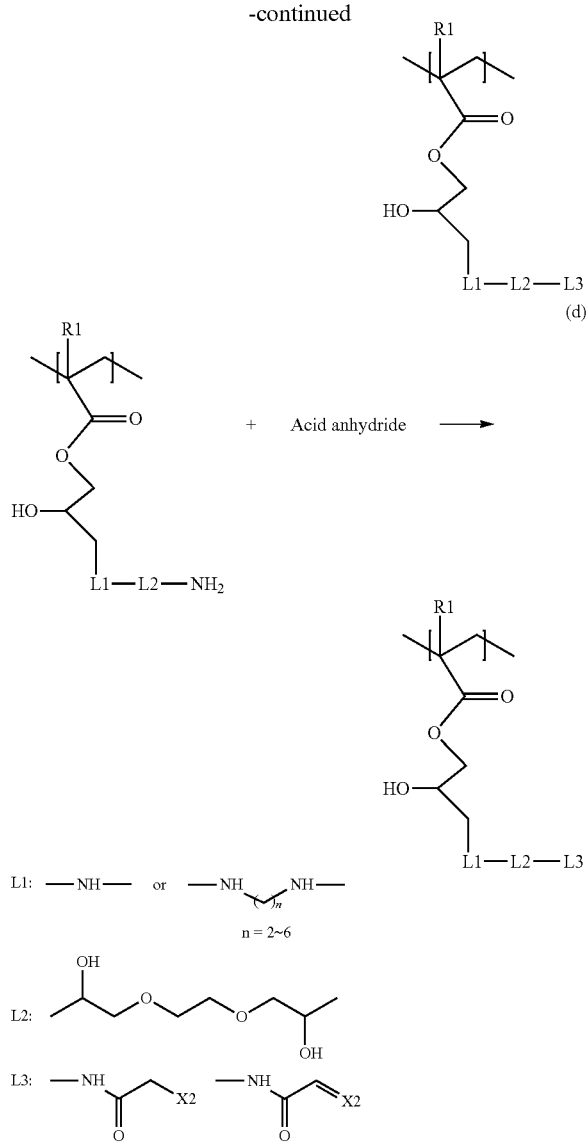

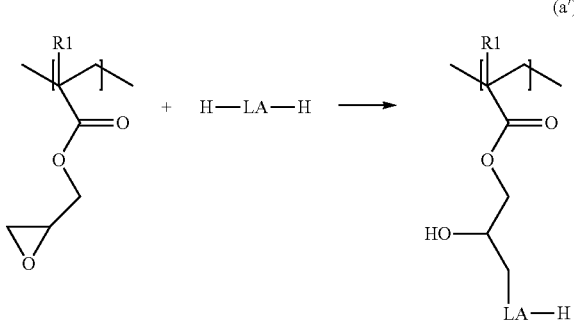

In the case of producing a particle having the side chain A having the partial structure X1-L-X2 of Formula (9), which is one of the exemplary embodiments of the present invention, a reaction scheme of chemical modification such as the following reaction formulae (a') and (b') can be applied.

Here, R1 represents a hydrogen atom or a methyl group.

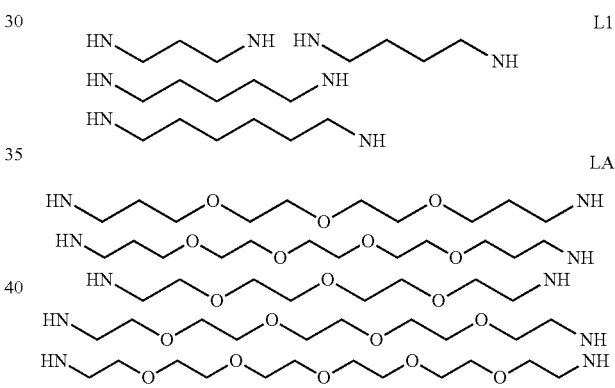

Here, R1 represents a hydrogen atom or a methyl group. Specific examples of the structures of H-L1-H and H-LA-H are illustrated below.

Similarly, the side chain B of the present invention can be formed by using a conventionally known anhydride such as acetic anhydride in place of an acid anhydride, in the step (d) of Formula (8). In addition, in the step (b') of Formula (9), the side chain B can be formed by using a conventionally known anhydride such as acetic anhydride in place of the acid anhydride.

The method of producing the above mother particle is not limited in a range in which the object of the present invention can be achieved. It is preferable to produce the mother particles by emulsion polymerization or soap-free emulsion polymerization among radical polymerization methods, from the viewpoint of obtaining particles having a sharp particle size distribution. Hereinafter, a procedure of producing the above mother particles by the soap-free emulsion polymerization will be exemplified below, but the present invention is not limited to this example.

Firstly, glycidyl (meth)acrylate, a styrene-based monomer and a radical polymerizable monomer having the crosslinking properties are mixed with an aqueous medium to obtain a mixture liquid. Next, a water-soluble radical polymerization initiator is charged into the above mixture liquid, and the resultant mixture liquid is heated as necessary to proceed a radical polymerization reaction. Thereby a dispersion liquid can be formed in which the mother particles are dispersed in the aqueous medium. In the process of forming the mother particles, glycidyl (meth)acrylate may further be additionally mixed. By doing so, it becomes easy to localize more repeating units derived from polyglycidyl (meth)acrylate on the surface of the mother particle.

It is preferable that the particle of the present invention is a particle which contains a polymer having a unit having a side chain having a hydroxyl group at a terminal. It is preferable that the hydroxyl group exists on a surface of the particle. For example, in the case where the particle of the present invention is obtained by a method of firstly producing the mother particle having a repeating unit derived from glycidyl (meth)acrylate on the surface thereof and then chemically modifying a glycidyl group on the surface of the mother particle, there is the case where the glycidyl group remains on the surface of the particle, in the reaction scheme of the chemical modification of the reaction formulae (a) to (d) or the reaction formulae (a') and (b'). Because the glycidyl group has hydrophobicity, when the particle of the present invention is used as the particles for the agglutination method, there is concern that the particle results in exhibiting the non-specific adsorption. In addition, when particles in which the glycidyl groups remain on the surfaces of the particles are stored for a long period of time, the glycidyl groups are hydrolyzed with time, and there is concern that the physical properties of the particles change. For these reasons, in the present invention, it is preferable to chemically modify the residual glycidyl group with a chemical compound having a hydroxyl group to form a polymer having a unit having a side chain C having a hydroxyl group at the terminal, on the surface of the particle. Methods for forming the polymer having the unit having the side chain C having the hydroxyl group at the terminal are not particularly limited in a range in which the object of the present invention can be achieved; but include a method of chemically modifying the glycidyl group with the use of a chemical compound that has a hydroxyl group and has a functional group which chemically reacts with the glycidyl group as is shown in the following reaction formula (a"), and a method of promoting a ring-opening reaction of the glycidyl group as is shown in the following reaction formula (b") and converting the glycidyl group to glycol.

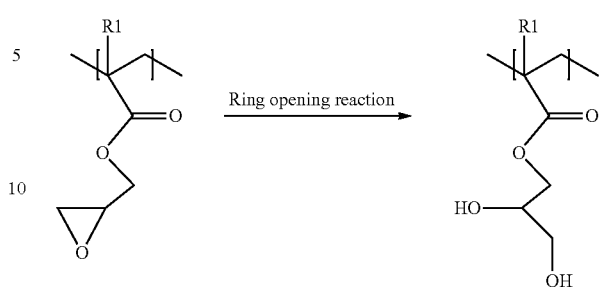

Here, R1 represents a hydrogen atom or a methyl group, H—P represents a functional group that reacts with glycidyl, and Q represents a site having a hydroxyl group.

The chemical compound to be used in the reaction formula (a") is not particularly limited in a range in which the object of the present invention can be achieved, but it is preferable to use a chemical compound having a thiol group having high reactivity with a glycidyl group, or a chemical compound having an amino group.

Examples of the chemical compound having the thiol group include 3-mercapto-1,2-propanediol, 2-mercaptoethanol, 3-mercaptopropanol, 1-mercapto-2-propanol, and 2-mercapto-3-butanol. In addition, examples of the chemical compound having the amino group include 2-amino-2-(hydroxymethyl)-1,3-propanediol, 2-amino-1,3-butanediol, 3-amino-1,2-propanediol, 2-amino-1,3-propanediol, 2-aminoethanol, and amino methanol.

From the viewpoint of further enhancing the capability of suppressing the non-specific adsorption of the particles of the present invention, it is more preferable to use a chemical compound having the amino group in which a chemically bonded site shows higher hydrophilicity, which will be formed by chemical modification. A plurality of the exemplified chemical compounds may be used in combination.

In the present invention, it is preferable that the above unit having the side chain C having a hydroxyl group at the terminal is a chemical structure of any of the following Formulae (3) to (6). In particular, Formula (4) and Formula (5) have many hydroxyl groups, show a remarkable tendency of hydrophilicity, and are very preferable as a structure for suppressing the non-specific adsorption to the particle.

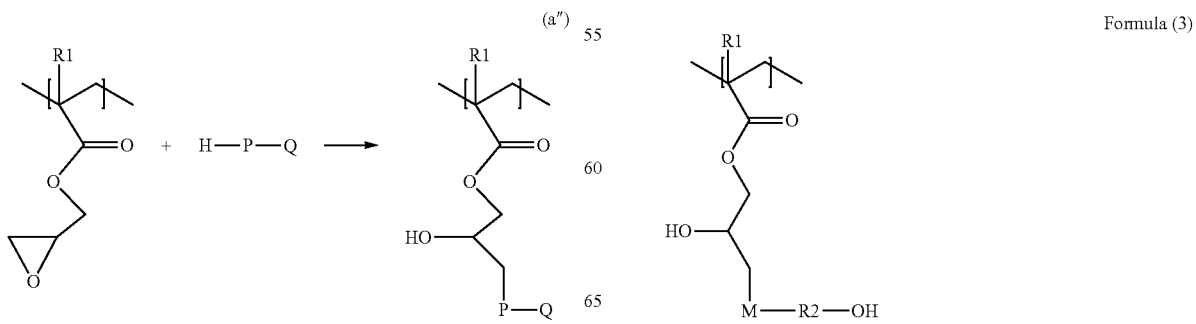

-continued

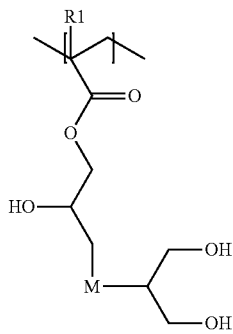

Formula (4)

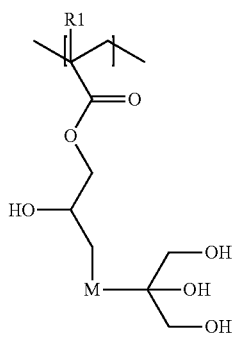

Formula (5)

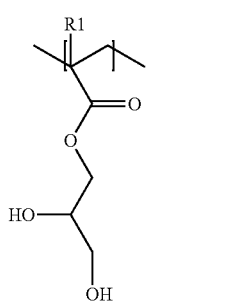

Formula (6)

Here, M represents NH or S. In addition, R1 represents a hydrogen atom or a methyl group, and R2 represents an alkyl group.

The ligand in the present invention is a chemical compound that specifically bonds to a receptor which a particular target substance has. The site at which the ligand bonds to the target substance is determined, and has a selectively or specifically high affinity. Examples of the combination of the ligand and the target substance include: an antigen and an antibody; an enzyme protein and a substrate thereof; a signal substance represented by hormones and neurotransmitters, and a receptor thereof; and a nucleic acid; but are not limited to these substances in a range in which the object of the present invention can be achieved. Examples of the ligands include an antigen, an antibody, an antigen bonding fragment (for example, Fab, F (ab')2, F(ab'), Fv, scFv and the like), a naturally-occurring nucleic acid, an artificial nucleic acid, an aptamer, a peptide aptamer, an oligopeptide, an enzyme and a coenzyme.

In the present invention, it is intended to use affinity particles each having the above ligand chemically bonded via the side chain A, as the particles for the agglutination method, which are used for the agglutination method in the immunoassay.

In the present invention, a conventionally known method can be applied as a method of a chemical reaction for chemically bonding a carboxyl group derived from the side chain A and a ligand to each other, in a range in which the object of the present invention can be achieved. For example, carbodiimide mediated reactions and NHS ester activation reactions are examples of suitable chemical reactions. However, the method of the chemical reaction for chemically bonding the carboxyl group derived from the side chain A and the ligand is not limited to these chemical reactions, in a range in which the object of the present invention can be achieved.

In the present invention, when the antibody (antigen) is used as the ligand and the antigen (antibody) is used as a target substance, the combination can be very preferably applied to the agglutination method in the immunoassay which is widely used in the fields of clinical examinations, biochemical researches and the like, as a method of detecting the target substance in the specimen, in the in vitro diagnosis. This is because when a general particle is used as a particle for the agglutination method, an antigen (antibody) of a target substance, foreign matters in serum and the like non-specifically adsorb onto the surface of the particle, and unintended interparticle agglutination results in occurring due to this non-specific adsorption, which results in impairing the accuracy of the examination.

A reagent for use in detecting a target substance in a specimen by in vitro diagnosis of the present invention includes the particles for the agglutination method of the present invention. It is preferable for the amount of the particles for the agglutination method, which are contained in the reagent of the present invention, to be 0.001% by mass or more and 20% by mass or less, and is more preferable to be 0.01% by mass or more and 10% by mass or less. The reagent of the present invention may contain a third substance such as a solvent and a blocking agent, in addition to the particles for the agglutination method of the present invention, in a range in which the object of the present invention can be achieved. Examples of the solvent to be used in the present invention include various aqueous buffer solutions such as a phosphate buffer solution, a glycine buffer solution, Good's buffer solution, a tris buffer solution, HEPES buffer solution, a female buffer solution, and an ammonia buffer solution; but the solvent contained in the reagent of the present invention is not limited to these solutions.

A kit for use in detecting a target substance in a specimen by in vitro diagnosis of the present invention includes at least the reagent of the present invention. The kit of the present invention preferably further includes a reaction buffer solution containing albumin (hereinafter referred to as reagent 2), in addition to the reagent of the present invention (hereinafter referred to as reagent 1). Examples of the above albumin include serum albumin, and those which have been subjected to protease treatment may also be used. The amount of albumin contained in the reagent 2 is 0.001% by mass or more and 5% by mass or less, as a guide; but the kit of the present invention is not limited to this aspect. Both or either one of reagent 1 and reagent 2 may contain a sensitizer for agglutination measurement. Examples of the sensitizer for the agglutination measurement include polyvinyl alcohol, polyvinyl pyrrolidone and poly alginic acid; but the kit of the present invention is not limited to this aspect. In addition, the kit of the present invention may include a positive control, a negative control and a diluted solution of serum, in addition to the reagent 1 and the reagent 2. As a medium for the positive control and the negative control, a solvent may be used, other than serum, physiological saline and the like which do not contain a target substance that can be measured. The kit of the present invention can be used in the method of detecting the target substance, according to the present invention, similarly to the kit to be used for detecting a target substance in a specimen by ordinary in vitro diagnosis. In addition, the kit of the present invention can measure also a concentration of the target substance by a conventionally known method, and is suitable to be used for detecting the target substance in the specimen particularly by the agglutination method.

The method of detecting the target substance in the specimen by in vitro diagnosis, according to the present invention includes mixing the particles for the agglutination method of the present invention with the specimen that possibly contains the target substance. In addition, it is preferable to mix the particles for the agglutination method of the present invention with the specimen at a pH of 3.0 or higher and 11.0 or lower. In addition, the mixing temperature is 20° C. or higher and 50° C. or lower, and the mixing time period is in a range between 1 minute and 20 minutes. In addition, it is preferable that a solvent is used in the present detection method. In addition, it is preferable for the concentration of the particles for the agglutination method of the present invention in the detection method of the present invention, in the reaction system, to be 0.001% by mass or higher and 5% by mass or lower, and is more preferable to be 0.01% by mass or higher and 1% by mass or lower. The detection method of the present invention includes optically detecting the interparticle agglutination that occurs as a result of mixing the particles for the agglutination method of the present invention with a specimen; and by the optical detection of the above interparticle agglutination, a target substance in the specimen is detected and the concentration of the target substance can also be measured. As for a method of optically detecting the above agglutination reaction, optical instruments may be used which can detect an intensity of scattered light, an intensity of transmitted light, an absorbance and the like, and the amounts of changes in these values may be measured.

EXAMPLES

The present invention will be described below in detail with reference to Examples, but the present invention is not limited to these Examples.

"Example 1" (Synthesis of Particle Containing Polyglycidyl (Meth)Acrylate (Particle 1))

Into a 500 ml four-necked round bottom flask, 3.60 g of styrene (St: produced by Kishida Chemical Co., Ltd.), 5.40 g of glycidyl methacrylate (GMA; Tokyo Chemical Industry Co., Ltd.), 0.12 g of divinylbenzene (Kishida Chemical Co., Ltd.) and 345 g of ion-exchanged water were weighed out to obtain a mixture liquid, and the mixture liquid was kept at 70° C. while being stirred at 200 rpm, and was subjected to nitrogen bubbling for 30 minutes. Next, the nitrogen bubbling was switched to a nitrogen flow, a solution was added to the above mixture liquid, which was separately prepared by dissolving 0.18 g of V-50 (produced by Fujifilm Wako Pure Chemical Corporation) in 15.0 g of ion-exchanged water, and thereby radical polymerization (soap-free emulsion polymerization) was started. After 2 hours from the start of the polymerization, 0.92 g of GMA was added to a reaction field of the radical polymerization, the mixture was kept at 70° C. for further 8 hours while being stirred at 200 rpm, and thereby a Dispersion liquid 1 containing the Particle 1 was obtained. The content of the 500 ml four-necked round bottom flask was slowly cooled to room temperature, then was sampled, and was subjected to the evaluation of a radical polymerization conversion rate with the use of proton NMR, gas chromatography and gel permeation chromatography. As a result, it was confirmed to be substantially 100%. The cumulant particle size of the Particle 1 was 210 nm.

"Example 2" (Synthesis of Particle 2)

Into a 200 ml four-necked round bottom flask, 20 g of the Dispersion liquid 1 was weighed out, and then was kept at 4° C. while being stirred at 100 rpm. In the state, 4.82 g in total amount of diethylene glycol bis(3-aminopropyl)ether (DEG-3APE; produced by Tokyo Chemical Industry Co., Ltd.) was mixed with the Dispersion liquid 1 at a rate of 2.0 g/min, while the mixture was irradiated with ultrasonic waves (28 kHz, 100 W) from the outside of the above 200 ml four-necked round bottom flask, and Mixture liquid 2 was prepared. After that, the Mixture liquid 2 was kept at 40° C. for 24 hours while being stirred at 100 rpm. Thereby, the glycidyl group derived from the polyglycidyl methacrylate of the Particle 1 reacted with the primary amine derived from the DEG-3APE, and Particle 2' was obtained in which the DEG-3APE was bonded to the Particle 1 at one terminal. The Particle 2' was centrifugally purified with the use of ion-exchanged water under conditions of 4° C., 27000 G, 20 minutes and 3 times. After that, the solid content was adjusted with ion-exchanged water so as to become 5 wt %, and 1.48 g of tris(hydroxymethyl)aminomethane (Tris; produced by Tokyo Chemical Industry Co., Ltd.) was further added thereto. After that, the mixture was stirred, and thereby the Tris was dissolved. Next, the pH was adjusted to 11 with triethylamine (produced by Kishida Chemical Co., Ltd.), and the mixture was stirred at 70° C. for 24 hours. After that, the resultant mixture was subjected to centrifugal separation at 4° C., at 27000 G for 20 minutes, and the supernatant was discarded. The precipitate was subjected to the purification of being redispersed by ion-exchanged water, five times in total. Next, the resultant precipitation was subjected to centrifugal purification again, was then redispersed in methanol so that the solid fraction became 1 wt %, and thereby Dispersion liquid 2' was prepared. Next, 2.77 g of a previously weighed reagent in which succinic anhydride (produced by Tokyo Chemical Industry Co., Ltd.) was mixed with acetic anhydride (produced by Tokyo Chemical Industry Co., Ltd.) so as to become 1:3 (molar fraction) was added to the Dispersion liquid 2' which was weighed out so that the Particle 2' became 0.63 g, and the mixture was shaken at 30° C. for 5 hours to thereby allow the primary amine derived from the Particle 2' to react with succinic anhydride, and the Particle 2 was obtained in which a carboxyl group was introduced into the particle 1 via DEG-3APE. The Particle 2 was divided into three equal parts, the parts were treated by the following three methods, and the aqueous dispersion liquids of Particle 2-1, Particle 2-2 and Particle 2-3 were obtained, in which the carboxyl group was neutralized with the use of triethylamine as a base, the carboxyl group was neutralized with the use of sodium as a base, and the carboxyl group was not neutralized, respectively.

(i) Method for Preparing Particle 2-1

The Particle 2 was centrifugally purified with the use of an aqueous solution of 3 wt % triethylamine under the conditions of 27000 G, 20 minutes and 3 times, and further centrifugally purified with the use of ultrapure water under the conditions of 27000 G, 20 minutes and 8 times.

(ii) Method for Preparing Particle 2-2

The Particle 2 was centrifugally purified with the use of an aqueous solution of 0.1 N NaOH under the conditions of 27000 G, 20 minutes and 3 times, and further centrifugally purified with the use of ultrapure water under the conditions of 27000 G, 20 minutes and 8 times.

(iii) Method for Preparing Particle 2-3

The Particle 2 was centrifugally purified with the use of methanol under the conditions of 27000 G, 20 minutes and 3 times, and further centrifugally purified with the use of ultrapure water under the conditions of 27000 G, 20 minutes and 8 times.

Various characteristics of the Particle 2-1 are summarized in Table 1. In addition, the dispersion stabilities of the aqueous dispersion liquids of the Particles 2-1, 2-2 and 2-3 were compared in Table 2.

"Example 3" (Synthesis of Particle 3)

An aqueous dispersion liquid of Particle 3 was obtained in the same manner as in Example 2 and Example 2(i), except that maleic anhydride (produced by Tokyo Chemical Industry Co., Ltd.) was used in place of succinic anhydride. Various characteristics of the obtained Particle are summarized in Table 1.

"Example 4" (Synthesis of Particle 4)

An aqueous dispersion liquid of Particle 4 was obtained in the same manner as in Example 2 and Example 2(i), except that the reagent in which succinic anhydride and acetic anhydride were mixed so as to become 1:3 (molar fraction) was changed to a reagent in which succinic anhydride and acetic anhydride were mixed so as to become 3:17 (molar fraction).

"Example 5" (Synthesis of Particle 5)

An aqueous dispersion liquid of Particle 5 was obtained in the same manner as in Example 2 and Example 2(i), except that the reagent in which succinic anhydride and acetic anhydride were mixed so as to become 1:3 (molar fraction) was changed to a reagent in which succinic anhydride and acetic anhydride were mixed so as to become 9:11 (molar fraction).

"Example 6" (Synthesis of Particle 6)

An aqueous dispersion liquid of Particle 6 was obtained in the same manner as in Example 2 and Example 2(i), except that the reagent in which succinic anhydride and acetic anhydride were mixed so as to become 1:3 (molar fraction) was changed to a reagent in which succinic anhydride and acetic anhydride were mixed so as to become 2:23 (molar fraction).

"Example 7" (Synthesis of Particle 7)

An aqueous dispersion liquid of Particle 7 was obtained in the same manner as in Example 2 and Example 2(i), except that the reagent in which succinic anhydride and acetic anhydride were mixed so as to become 1:3 (molar fraction) was changed to a reagent in which succinic anhydride and acetic anhydride were mixed so as to become 1:1 (molar fraction).

"Example 8" (Synthesis of Particle 8)

An aqueous dispersion liquid of Particle 8 was obtained in the same manner as in Example 2 and Example 2(i), except that the reagent in which succinic anhydride and acetic anhydride were mixed so as to become 1:3 (molar fraction) was changed to a reagent in which succinic anhydride and acetic anhydride were mixed so as to become 1:4 (molar fraction).

"Example 9" (Synthesis of Particle 9)

An aqueous dispersion liquid of Particle 9 was obtained in the same manner as in Example 2 and Example 2(i), except that the reagent in which succinic anhydride and acetic anhydride were mixed so as to become 1:3 (molar fraction) was changed to a reagent in which succinic anhydride and acetic anhydride were mixed so as to become 1:9 (molar fraction).

"Example 10" (Synthesis of Particle 10)

An aqueous dispersion liquid of Particle 10 was obtained in the same manner as in Example 2 and Example 2(i), except that the Tris was changed to 2-amino-1,3-propanediol.

"Example 11" (Synthesis of Particle 11)

Into a 200 ml four-necked round bottom flask, 20 g of the Dispersion liquid 1 was weighed out, and then was kept at 4° C. while being stirred at 100 rpm. In the state, 4.82 g in total amount of diethylene glycol bis(3-aminopropyl)ether (DEG-3APE; produced by Tokyo Chemical Industry Co., Ltd.) was mixed with the Dispersion liquid 1 at a rate of 2.0 g/min, while the mixture was irradiated with ultrasonic waves (28 kHz, 100 W) from the outside of the above 200 ml four-necked round bottom flask, and Mixture liquid 2 was prepared. After that, the Mixture liquid 2 was kept at 40° C. for 24 hours while being stirred at 100 rpm. Thereby, the glycidyl group derived from the polyglycidyl methacrylate of the Particle 1 reacted with the primary amine derived from the DEG-3APE, and Particle 11' was obtained in which the DEG-3APE was bonded to the Particle 1 at one terminal. The Particle 11' was centrifugally purified with the use of ion-exchanged water under conditions of 4° C., 27000 G, 20 minutes and 3 times. After that, the resultant precipitation was redispersed in methanol so that the solid fraction became 1 wt %, and thereby Dispersion liquid 11" was prepared. Next, 2.77 g of a previously weighed reagent in which succinic anhydride (produced by Tokyo Chemical Industry Co., Ltd.) was mixed with acetic anhydride (produced by Tokyo Chemical Industry Co., Ltd.) so as to become 1:3 (molar fraction) was added to the Dispersion liquid 11" which was weighed out so that the Particle 11' became 0.63 g, and the mixture was shaken at 30° C. for 5 hours to thereby allow the primary amine derived from the Particle 11" to react with succinic anhydride, and a carboxyl group was introduced into the Particle 1 via DEG-3APE. The obtained particle was centrifugally purified with the use of an aqueous solution of 3 wt % triethylamine under the conditions of 27000 G, 20 minutes and 3 times, and further centrifugally purified with the use of ultrapure water under the conditions of 27000 G, 20 minutes and 8 times. Thereby, an aqueous dispersion liquid of Particle 11 was obtained.

"Example 12" (Synthesis of Particle 12)

Into a 200 ml four-necked round bottom flask, 20 g of the Dispersion liquid 1 was weighed out, and then was kept at 4° C. while being stirred at 100 rpm. In the state, 4.21 g in total amount of bis[2-(2-aminoethoxy)ethyl]ether (DEG-2AEE; produced by Tokyo Chemical Industry Co., Ltd.) was mixed with the Dispersion liquid 1 at a rate of 2.0 g/min, while the mixture was irradiated with ultrasonic waves (28 kHz, 100 W) from the outside of the above 200 ml four-necked round bottom flask, and Mixture liquid 12 was prepared. After that, the Mixture liquid 12 was kept at 40° C. for 24 hours while being stirred at 100 rpm. Thereby, the glycidyl group derived from the polyglycidyl methacrylate of the Particle 1 reacted with the primary amine derived from the DEG-2AEE, and Particle 12' was obtained in which the DEG-2AEE was bonded to the Particle 1 at one terminal. The Particle 12' was centrifugally purified with the use of ion-exchanged water under conditions of 4° C., 27000 G, 20 minutes and 3 times. After that, the solid content of the resultant particle was adjusted with ion-exchanged water so as to become 5 wt %, and 1.48 g of Tris was further added thereto. After that, the mixture was stirred, and thereby the Tris was dissolved. Next, the pH was adjusted to 11 with triethylamine, and the mixture was stirred at 70° C. for 24 hours. After that, the resultant mixture was subjected to centrifugal separation at 4° C., at 27000 G for 20 minutes, and the supernatant was discarded. The precipitate was subjected to the purification of being redispersed by ion-exchanged water, five times in total. Next, the resultant precipitation was subjected to centrifugal purification again, was then redispersed in methanol so that the solid fraction became 1 wt %, and thereby Dispersion liquid 12''' was prepared. Next, 2.77 g of a previously weighed reagent in which succinic anhydride (produced by Tokyo Chemical Industry Co., Ltd.) was mixed with acetic anhydride (produced by Tokyo Chemical Industry Co., Ltd.) so as to become 1:3 (molar fraction) was added to the Dispersion liquid 12''' which was weighed out so that the Particle 12''' became 0.63 g, and the mixture was shaken at 30° C. for 5 hours to thereby allow the primary amine derived from the Particle 12''' to react with succinic anhydride, and the Particle 12 was obtained in which a carboxyl group was introduced into the Particle 1 via DEG-2AEE. The Particle 12 was centrifugally purified with the use of an aqueous solution of 3 wt % triethylamine under the conditions of 27000 G, 20 minutes and 3 times, and further centrifugally purified with the use of ultrapure water under the conditions of 27000 G, 20 minutes and 8 times. Thereby, an aqueous dispersion liquid of the Particle 12 was obtained. Various characteristics of the obtained Particle are summarized in Table 1.

"Example 13" (Synthesis of Particle 13)

Into a 200 ml four-necked round bottom flask, 20 g of the Dispersion liquid 1 was weighed out, and then was kept at 4° C. while being stirred at 100 rpm. In the state, 2.54 g in total amount of 1,6-hexanediamine (produced by Tokyo Chemical Industry Co., Ltd.) was mixed with the Dispersion liquid 1 at a rate of 2.0 g/min, while the mixture was irradiated with ultrasonic waves (28 kHz, 100 W) from the outside of the above 200 ml four-necked round bottom flask, and Mixture liquid 13-1 was prepared. After that, the Mixture liquid 13-1 was kept at 40° C. for 24 hours while being stirred at 100 rpm. Thereby, the glycidyl group derived from the polyglycidyl methacrylate of the Particle 1 reacted with the primary amine derived from the 1,6-hexanediamine, and Particle 13' was obtained in which the 1,6-hexanediamine was bonded to the Particle 1 at one terminal. The Particle 13' was centrifugally purified with the use of ion-exchanged water under conditions of 4° C., 27000 G, 20 minutes and 8 times. After that, the resultant precipitation was redispersed in ion-exchanged water so that the solid content became 10 wt %, and thereby Dispersion liquid 13' was prepared. Next, 3.81 g of ethylene glycol diglycidyl ether (EGDE: produced by Tokyo Chemical Industry Co., Ltd.) was added to the Dispersion liquid 13' which was weighed out so that the Particle 13' became 0.63 g, and the mixture was shaken at 30° C. for 24 hours. After that, an aqueous solution of 28% ammonia (produced by Tokyo Chemical Industry Co., Ltd.) of which the moles were 10 times those of EGDE in terms of ammonia was further added thereto, and then the mixture was shaken at 70° C. for 24 hours. Thereby, the Particle 13'' was obtained. The Particle 13'' was centrifugally purified with the use of ion-exchanged water under conditions of 4° C., 27000 G, 20 minutes and 8 times. After that, the solid content of the resultant particle was adjusted with ion-exchanged water so as to become 5 wt %, and 1.48 g of Tris was further added thereto. After that, the mixture was stirred, and thereby the Tris was dissolved. Next, the pH was adjusted to 11 with triethylamine, and the mixture was stirred at 70° C. for 24 hours. After that, the resultant mixture was subjected to centrifugal separation at 4° C., at 27000 G for 20 minutes, and the supernatant was discarded. The precipitate was subjected to the purification of being redispersed by ion-exchanged water, five times in total. Next, the resultant precipitation was subjected to centrifugal purification again, was then redispersed in methanol so that the solid fraction became 1 wt %, and thereby Dispersion liquid 13''' was prepared. Next, 2.77 g of a previously weighed reagent in which succinic anhydride (produced by Tokyo Chemical Industry Co., Ltd.) was mixed with acetic anhydride (produced by Tokyo Chemical Industry Co., Ltd.) so as to become 1:3 (molar fraction) was added to the Dispersion liquid 13''' which was weighed out so that the Particle 13''' became 0.63 g, and the mixture was shaken at 30° C. for 5 hours to thereby allow the primary amine derived from the Particle 5''' to react with succinic anhydride, and the Particle 13 was obtained in which 1,6-hexanediamine and a carboxyl group via EGDE were introduced into the Particle 1. The Particle 13 was centrifugally purified with the use of an aqueous solution of 3 wt % triethylamine under the conditions of 27000 G, 20 minutes and 3 times, and further centrifugally purified with the use of ultrapure water under the conditions of 27000 G, 20 minutes and 8 times. Thereby, an aqueous dispersion liquid of the Particle 13 was obtained. Various characteristics of the obtained Particle are summarized in Table 1.

"Example 14" (Synthesis of Particle 14)

An aqueous dispersion liquid of Particle 13 was obtained in the same manner as in Example 13, except that 1.93 g of 1,4-butanediamine (produced by Tokyo Chemical Industry Co., Ltd.) was used in place of 1,6-hexanediamine. Various characteristics of the obtained Particle are summarized in Table 1.

"Example 15" (Synthesis of Particle 15)

An aqueous dispersion liquid of Particle 15 was obtained in the same manner as in Example 13, except that 1.32 g of ethylenediamine (produced by Tokyo Chemical Industry Co., Ltd.) was used in place of 1,6-hexanediamine. Various characteristics of the obtained Particle are summarized in Table 1.

"Example 16" (Synthesis of Particle 16)

An aqueous dispersion liquid of Particle 16 was obtained in the same manner as in Example 13, except that 1.62 g of 1,2-propanediamine (produced by Tokyo Chemical Industry Co., Ltd.) was used in place of 1,6-hexanediamine. Various characteristics of the obtained Particle are summarized in Table 1.

"Example 17" (Synthesis of Particle 17)

An aqueous dispersion liquid of Particle 17 was obtained in the same manner as in Example 13, except that 4.82 g of DEG-3APE was used in place of 1,6-hexanediamine. Various characteristics of the obtained Particle are summarized in Table 1.

"Example 18" (Synthesis of Particle 18)

Into a 200 ml four-necked round bottom flask, 20 g of the Dispersion liquid 1 was weighed out, and then was kept at 4° C. while being stirred at 100 rpm. In the state, 28% ammonia water of which the moles are 50 times with respect to the amount of glycidyl groups contained in the Dispersion liquid 1 which was weighed out was mixed with the Dispersion liquid 1 at a rate of 2.0 g/min, while the mixture was irradiated with ultrasonic waves (28 kHz, 100 W) from the outside of the above 200 ml four-necked round bottom flask, and Mixture liquid 10-1 was prepared. After that, the Mixture liquid 10-1 was kept at 70° C. for 24 hours while being stirred at 100 rpm. Thereby, Particle 18' was obtained in which a primary amine was added to the glycidyl group derived from the polyglycidyl methacrylate of the Particle 1. The Particle 18' was centrifugally purified with the use of ion-exchanged water under conditions of 4° C., 27000 G, 20 minutes and 8 times. After that, the resultant precipitation was redispersed in ion-exchanged water so that the solid content became 10 wt %, and thereby Dispersion liquid 12' was prepared. Next, 3.81 g of EGDE was added to the Dispersion liquid 18' which was weighed out so that the Particle 18' became 0.63 g, and the mixture was shaken at 30° C. for 24 hours. After that, an aqueous solution of 28% ammonia of which the moles were 10 times those of EGDE in terms of ammonia was further added thereto, and then the mixture was shaken at 70° C. for 24 hours. Thereby, the Particle 18" was obtained. The Particle 18" was centrifugally purified with the use of ion-exchanged water under conditions of 4° C., 27000 G, 20 minutes and 8 times. After that, the solid content of the resultant particle was adjusted with ion-exchanged water so as to become 5 wt %, and 1.479 g of Tris was further added thereto. After that, the mixture was stirred, and thereby the Tris was dissolved. Next, the pH was adjusted to 11 with triethylamine, and the mixture was stirred at 70° C. for 24 hours. After that, the resultant mixture was subjected to centrifugal separation at 4° C., at 27000 G for 20 minutes, and the supernatant was discarded. The precipitate was subjected to the purification of being redispersed by ion-exchanged water, five times in total, and thereby Particle 18''' was obtained. Next, the resultant precipitation was subjected to centrifugal purification again, was then redispersed in methanol so that the solid fraction became 1 wt %, and thereby Dispersion liquid 18''' was prepared. Next, 2.77 g of a previously weighed reagent in which succinic anhydride (produced by Tokyo Chemical Industry Co., Ltd.) was mixed with acetic anhydride (produced by Tokyo Chemical Industry Co., Ltd.) so as to become 1:3 (molar fraction) was added to the Dispersion liquid 18''' which was weighed out so that the Particle 18''' became 0.63 g, and the mixture was shaken at 30° C. for 5 hours to thereby allow the primary amine derived from the Particle 18''' to react with succinic anhydride, and the Particle 18 was obtained in which a carboxyl group was introduced into the Particle 1 via EGDE. The Particle 18 was centrifugally purified with the use of an aqueous solution of 3 wt % triethylamine under the conditions of 27000 G, 20 minutes and 3 times, and further centrifugally purified with the use of ultrapure water under the conditions of 27000 G, 20 minutes and 8 times. Thereby, an aqueous dispersion liquid of the Particle 18 was obtained. Various characteristics of the obtained Particle are summarized in Table 1.

"Example 19" (Synthesis of Particle 19)

An aqueous dispersion liquid of Particle 19 was obtained in the same manner as in Example 2 and Example 2(i), except that 3.25 g of ethylene glycol bis(2-aminoethyl) ether (produced by Tokyo Chemical Industry Co., Ltd.) was used in place of DEG-3APE. Various characteristics of the obtained Particle are summarized in Table 1.

"Comparative Example 1" (Synthesis of Particle 20)

An aqueous dispersion liquid of Particle 20 was obtained in the same manner as in Example 2 and Example 2(i), except that the reagent in which succinic anhydride and acetic anhydride were mixed so as to become 1:3 (molar fraction) was changed to a reagent in which succinic anhydride and acetic anhydride were mixed so as to become 3:97 (molar fraction).

"Comparative Example 2" (Synthesis of Particle 21)

An aqueous dispersion liquid of Particle 21 was obtained in the same manner as in Example 2 and Example 2(i), except that the reagent in which succinic anhydride and acetic anhydride were mixed so as to become 1:3 (molar fraction) was changed to a reagent in which succinic anhydride and acetic anhydride were mixed so as to become 3:47 (molar fraction).

"Comparative Example 3" (Synthesis of Particle 22)

An aqueous dispersion liquid of Particle 22 was obtained in the same manner as in Example 2 and Example 2(i), except that the reagent in which succinic anhydride and acetic anhydride were mixed so as to become 1:3 (molar fraction) was changed to a reagent in which succinic anhydride and acetic anhydride were mixed so as to become 3:2 (molar fraction).

"Comparative Example 4" (Synthesis of Particle 23)

An aqueous dispersion liquid of Particle 23 was obtained in the same manner as in Example 2 and Example 2(i), except that the reagent in which succinic anhydride and acetic anhydride were mixed so as to become 1:3 (molar fraction) was changed to a reagent in which succinic anhydride and acetic anhydride were mixed so as to become 3:1 (molar fraction).

"Comparative Example 5" (Synthesis of Particle 24)

An aqueous dispersion liquid of Particle 24 was obtained in the same manner as in Example 2 and Example 2(i), except that the reagent in which succinic anhydride and acetic anhydride were mixed so as to become 1:3 (molar fraction) was changed to only succinic anhydride.

<Evaluation of Capability of Suppressing Non-Specific Adsorption of Particle>

Dispersion liquids (P liquids) were prepared in which Particle 2-1, Particle 3, Particle 4, Particle 5, Particle 6, Particle 7, Particle 8, Particle 9, Particle 10, Particle 11, Particle 12, Particle 13, Particle 14, Particle 15, Particle 16, Particle 17, Particle 18 and Particle 19 were dispersed in phosphate buffer solutions so as to become 0.1 wt %, respectively. Next, 60 μl of an chyle solution (Q solution) including triolein, lecithin, free fatty acid, bovine albumin and a Tris buffer solution was added to each of 30 μl of the Dispersion liquids, and an absorbance at a wavelength of 572 nm was measured for each of the mixture liquids immediately after stirring. The spectrophotometer GeneQuAnt1300 manufactured by Biochrom Ltd. was used for the absorbance measurement. Then, each of the mixture liquids was left at rest at 37° C. for 5 minutes, the absorbance at a wavelength of 572 nm was measured again, and the value of an amount of change in absorbance ΔABS× 10000 was calculated. The results are summarized in Table 3. It is interpreted that the larger the value is, the more non-specific adsorption occurs. However, as has been described also in the embodiment, when the side chain length of the side chain A becomes long, the interparticle agglutination also occurs which originates from the osmotic pressure occurring when the P liquid and the Q liquid have been mixed, and accordingly even if the value is large, it cannot be necessarily pronounced that the non-specific adsorption occurs. However, when the particle having the large value is chemically bonded with a ligand via a side chain A and is used as a particle for the latex agglutination, the particle substantially cannot distinguish the interparticle agglutination due to the non-specific adsorption from the interparticle agglutination originating from the osmotic pressure, and it is considered to be difficult to use the particle.

<Chemical Bond Between Side Chain a and Ligand>

Dispersion liquids each in amount of 1 μl were prepared in which Particle 2-1, Particle 2-2, Particle 2-3, Particle 3, Particle 4, Particle 5, Particle 6, Particle 7, Particle 8, Particle 9, Particle 10, Particle 11, Particle 12, Particle 13, Particle 14, Particle 15, Particle 16, Particle 17, Particle 18 and Particle 19 were dispersed in phosphate buffer solutions so as to become 1.0 wt %, respectively. To each of these dispersion liquids, a solution was added in which 0.055 mg of 1-[3-(dimethylaminopropyl)-3-ethylcarbodiimide] (produced by Fujifilm Wako Pure Chemical Corporation) were dissolved in 10 μl of a phosphate buffer solution, then 5 μl of a dispersion liquid which contains 4.9 mg/ml of clone C5 (produced by Funakoshi Co., Ltd.) of monoclonal mouse anti-euman C-reactive protein (hereinafter CRP antibody) and 5 μl of a dispersion liquid which contains 5.8 mg/ml of clone C6 (produced by Funakoshi Co., Ltd.) were added thereto, and the mixture was shaken at room temperature for 180 hours. Thereby, the carboxyl group that the side chain A has at the terminal was chemically bonded with a ligand, and particles for the latex agglutination were obtained. Next, the particles for the latex agglutination were centrifugally purified under the conditions of 4° C., 15000 rpm, and 3 times, and finally stored as a dispersion liquid (hereinafter referred to as R2) in which the resultant particles were dispersed in 1 ml of a phosphate buffer solution. Hereinafter, the names of the particles for the latex agglutination will follow the names of the particle as they are, and shall be expressed as Particles 2-1 for the latex agglutination and Particles 3 for the latex agglutination. For the purpose of comparing how different the reactivity between the carboxyl group and the ligand is when the carboxyl group has been neutralized with a metal base or an organic base, the amounts of ligands to be bonded with the Particles 2-1 for the latex agglutination, Particles 2-2 for the latex agglutination and Particles 2-3 for the latex agglutination have been summarized in Table 4.

<Evaluation of Interparticle Agglutination Properties with Respect to Human CRP Antigen>

A mixture liquid (hereinafter, referred to as R1+) was prepared in which 1 μl of Human CRP (C4063 produced by Sigma Corporation, C-reactive protein derived from human plasma, 32 mg/dl) was mixed with 50 μl of a buffer solution (buffer solution (R-1) of DENKA SETKEN, CRP-L auto "TBA"), and was kept warm at 37° C. In addition, a mixture liquid (hereinafter, referred to as R1-) was prepared as a control, in which 1 μl of a phosphate buffer solution was mixed with 50 μl of a buffer solution (buffer solution (R-1) of Denka Company Limited, CRP-L auto "TBA"), and was kept warm similarly at 37° C. Next, 50 μl of R2 that contained each of the particles for the latex agglutination, which were prepared in Example 21 was mixed with R1+ or R1-, and the absorbance at a wavelength of 572 nm was measured for the mixture liquid immediately after stirring. The absorbance was measured with the use of a spectrophotometer GeneQuant 1300 manufactured by Biochrom Ltd. Then, the mixture liquid was left at rest at 37° C. for 5 minutes, then the absorbance at a wavelength of 572 nm was measured again, and the value of the amount of change in the absorbance ΔABS×10000 was calculated. This series of evaluations were performed on R2 immediately after the preparation in Example 10, R2 after 24 hours after the adjustment, and R2 after 72 hours after the adjustment, respectively. The results are summarized in Table 5. As for the Particles 17 for the latex agglutination, ΔABS×10000 in the case where R1- was used exceeded 1000 and was evaluated as bad, but it is considered to be a positive result that R1+ showed a very high value at least immediately after the adjustment. As for the ΔABS×10000 in the case where R1+ was used, which was evaluated in the present Examples, any of the Particles for the latex agglutination showed a value of fair or higher, and it can be determined that the Particles were provided with sufficient sensitivity. In particular, the Particles 2-1 for the latex agglutination and the Particles 3 to 19 for the latex agglutination showed remarkably high values, which are considered to be satisfactory results.

TABLE 1

| | Name of particle |
|---|---|
| | Example |
| | 2-1 | 3 | 4 | 5 | 6 | 7 | 8 | 9 | 10 | 11 | 12 | 13 | 14 |
|---|---|---|---|---|---|---|---|---|---|---|---|---|---|
| Zeta potential (-mV) | 29 | 29 | 14 | 36 | 7 | 38 | 22 | 10 | 29 | 29 | 28 | 28 | 28 |
| [Number of units having side chain A]/[[Number of units having side chain A] + [Number of units having side chain B]] × 100 | 25 | 25 | 15 | 45 | 8 | 50 | 20 | 10 | 25 | 25 | 25 | 25 | 25 |
| Sum of X1-L-X2 | 20 | 20 | 18 | 24 | 22 | 20 | 20 | 20 | 20 | 20 | 18 | 24 | 22 |
| δh of X1-L-X2 | 8.5 | 8.5 | 8.5 | 8.5 | 8.5 | 8.5 | 8.5 | 8.5 | 8.5 | 8.5 | 8.5 | 8.6 | 9.6 |
| Presence or absence of branch structure in X1-L-X2 | Absent | Absent | Absent | Absent | Absent | Absent | Absent | Absent | Absent | Absent | Absent | Absent | Absent |
| Number of amine-derived nitrogen atoms contained in X1-L-X2 | 1 | 1 | 1 | 1 | 1 | 1 | 1 | 1 | 1 | 2 | 2 | 2 | 2 |
| Particle size (nm) | 211 | 212 | 211 | 211 | 211 | 211 | 211 | 211 | 211 | 213 | 212 | 211 |

| | Name of particle | | | | | | | | |
|---|---|---|---|---|---|---|---|---|---|
| | Example | | | | Comparative Example | | | | |
| | 15 | 16 | 17 | 18 | 19 | 20 | 21 | 22 | 23 |
| Zeta potential (-mV) | 29 | 28 | 28 | 29 | 29 | 2 | 4 | 43 | 46 |
| [Number of units having side chain A]/[[Number of units having side chain A] + [Number of units having side chain B]] × 100 | 25 | 25 | 25 | 25 | 25 | 3 | 6 | 60 | 75 |
| Sum of X1-L-X2 | 20 | 20 | 31 | 17 | 15 | 20 | 20 | 20 | 20 |
| δh of X1-L-X2 | 10.8 | 11.6 | 7.5 | 12.1 | 10.2 | 8.5 | 8.5 | 8.5 | 8.5 |
| Presence or absence of branch structure in X1-L-X2 | Absent | Absent | Absent | Absent | Absent | Absent | Absent | Absent | Absent |
| Number of amine-derived nitrogen atoms contained in X1-L-X2 | 2 | 2 | 1 | 1 | 1 | 1 | 1 | 1 | 1 |
| Particle size (nm) | 211 | 212 | 218 | 211 | 211 | 211 | 213 | 211 | 211 |

TABLE 2

| | Name of particle | | |
|---|---|---|---|
| | 2-1 | 2-2 | 2-3 |
| Type of salt | Triethylamine | Sodium | — |
| Dispersibility after 1 day of still standing at 4° C. | Dispersed | Dispersed | Dispersed |
| Dispersibility after 7 days of still standing at 4° C. | Dispersed | Dispersed | Slightly settled |

TABLE 3

| | Name of particle Example | | | | | | | | |
|---|---|---|---|---|---|---|---|---|---|
| | 2-1 | 3 | 4 | 5 | 6 | 7 | 8 | 9 | 10 |
| $\Delta ABS \times 10000$ | 12 | 9 | 13 | 11 | 12 | 11 | 10 | 13 | 12 |
| Assessment | excellent | excellent | excellent | excellent | excellent | excellent | excellent | excellent | excellent |

| | Name of particle Example | | | | | | | | |
|---|---|---|---|---|---|---|---|---|
| | 11 | 12 | 13 | 14 | 15 | 16 | 17 | 18 | 19 |
| $\Delta ABS \times 10000$ | 628 | 172 | 498 | 286 | 165 | 166 | 1989 | 11 | 13 |
| Assessment | fair | good | good | good | good | good | bad | excellent | excellent |

| | Name of particle Comparative Example | | | | |
|---|---|---|---|---|---|
| | 20 | 21 | 22 | 23 | 24 |
| $\Delta ABS \times 10000$ | 11 | 13 | 16 | 15 | 12 |
| Assessment | excellent | excellent | excellent | excellent | excellent | smaller than 100: excellent
100 or larger and smaller than 500: good
500 or larger and smaller than 1000: fair
1000 or larger: bad

TABLE 4

| | Name of particle | | |
|---|---|---|---|
| | Particle 2-1 for latex agglutination | Particle 2-2 for latex agglutination | Particle 2-3 for latex agglutination |
| Type of functional group | Triethylamine salt of carboxyl group | Sodium salt of carboxyl group | — |
| Amount (pieces) of ligands bonded to one particle | 1080 | 687 | 1096 |

TABLE 5

| | | Name of particle Example | | | | | | | | | |
|---|---|---|---|---|---|---|---|---|---|---|---|
| | | Particle for latex agglutination 2-1 | Particle for latex agglutination 3 | Particle for latex agglutination 4 | Particle for latex agglutination 5 | Particle for latex agglutination 6 | Particle for latex agglutination 7 | Particle for latex agglutination 8 | Particle for latex agglutination 9 | Particle for latex agglutination 10 | Particle for latex agglutination 11 |
| $\Delta ABS \times 10000$ when R2 immediately after preparation was used | R1− | 11 | 10 | 11 | 12 | 11 | 12 | 12 | 10 | 11 | 531 |
| | R1+ | 24105 | 24006 | 16870 | 16587 | 10594 | 15650 | 21005 | 15210 | 24109 | 25000 |
| $\Delta ABS \times 10000$ when R2 after 24 hours after preparation was used | R1− | 4 | 13 | 12 | 12 | 12 | 13 | 11 | 11 | 14 | 524 |
| | R1+ | 24056 | 24350 | 16753 | 16542 | 10321 | 15210 | 21056 | 15322 | 24051 | 25000 |
| $\Delta ABS \times 10000$ when R2 after 72 hours after preparation was used | R1− | 3 | 12 | 12 | 11 | 11 | 13 | 14 | 10 | 12 | 529 |
| | R1+ | 24850 | 24113 | 16812 | 16578 | 10210 | 15340 | 20987 | 15201 | 24350 | 25000 |

TABLE 5-continued

| | | Name of particle Example | | | | | | | |
|---|---|---|---|---|---|---|---|---|---|
| | | Particle for latex agglutination 12 | Particle for latex agglutination 13 | Particle for latex agglutination 14 | Particle for latex agglutination 15 | Particle for latex agglutination 16 | Particle for latex agglutination 17 | Particle for latex agglutination 18 | Particle for latex agglutination 19 |
| ΔABS × 10000 when R2 immediately after preparation was used | R1− | 151 | 436 | 251 | 143 | 147 | 1590 | 11 | 10 |
| | R1+ | 21005 | 24620 | 24801 | 20912 | 15213 | 24938 | 16234 | 14980 |
| ΔABS × 10000 when R2 after 24 hours after preparation was used | R1× | 142 | 495 | 302 | 162 | 152 | 1681 | 12 | 13 |
| | R1+ | 21593 | 23981 | 24298 | 20598 | 15037 | 10100 | 15987 | 15004 |
| ΔABS × 10000 when R2 after 72 hours after preparation was used | R1× | 149 | 457 | 295 | 151 | 143 | 1780 | 11 | 12 |
| | R1+ | 21269 | 24926 | 24638 | 20769 | 15119 | 3599 | 16124 | 14896 |

| | | Name of particle Comparative Example | | | | |
|---|---|---|---|---|---|---|
| | | Particle for latex agglutination 20 | Particle for latex agglutination 21 | Particle for latex agglutination 22 | Particle for latex agglutination 23 | Particle for latex agglutination 24 |
| ΔABS × 10000 when R2 immediately after preparation was used | R1− | 12 | 13 | 15 | 15 | 11 |
| | R1+ | 1560 | 3401 | 6185 | 6204 | 6287 |
| ΔABS × 10000 when R2 after 24 hours after preparation was used | R1− | 11 | 11 | 13 | 15 | 12 |
| | R1+ | 1654 | 3587 | 6205 | 6198 | 6382 |
| ΔABS × 10000 when R2 after 72 hours after preparation was used | R1− | 15 | 13 | 16 | 14 | 11 |
| | R1+ | 1423 | 3486 | 6188 | 6215 | 6238 |

R1−: smaller than 100: ecellent
100 or larger and smaller than 500: good
500 or larger and smaller than 1000: fair
1000 or larger: bad
R1+: 5000 or larger: ecellent
4000 or larger and smaller than 5000: good
3000 or larger and smaller than 4000: fair
smaller than 3000: bad According to the present invention, there can be provided a particle of which the non-specific adsorption is small, and which has a reactive functional group for chemically bonding a ligand thereto.

Furthermore, in the present invention, there can be provided a particle for the agglutination method in which a ligand is chemically bonded to the particle; a reagent and a kit for in vitro diagnosis including the particle; and a method for detecting a target substance, with the use of the reagent and the kit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-153211, filed Aug. 23, 2019, which is hereby incorporated by reference herein in its entirety.

What is claimed is:

1. An affinity particle comprising a particle including:
a polymer including a repeating unit having a side chain A represented by formula (10) and a repeating unit having a side chain B represented by formula (10'):

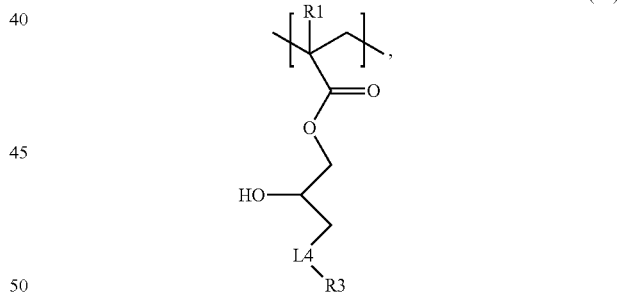

(10)

wherein, in the formula (10):

R1 is H or $CH_3$;

L4 is a partial structure containing a plural number of interatomic bonds; and

R3 is represented by formula (11) or (12):

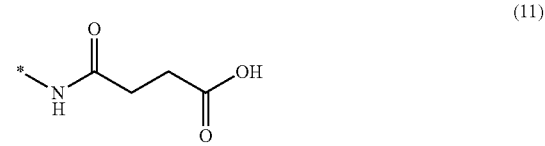

(11)

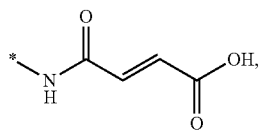
(12)

wherein, in the formula (11) and (12), * represents bonding to a terminal atom of L4;

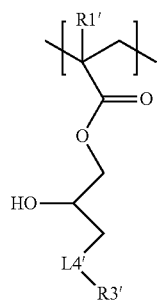
(10')

wherein, in the formula (10');
R1' is H or CH$_3$;
L4' is a partial structure containing a plural number of interatomic bonds; and
R3' is represented by formula (13):

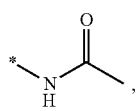
(13)

wherein, in the formula (13), * represents bonding to a terminal atom of L4'; and
a ligand bonded to the particle via the side chain A,
wherein the unit having the side chain A and the unit having the side chain B satisfy a relationship of expression (1'):

20≤(number of units having side chain $A$)/((number of units having side chain $A$)+(number of units having side chain $B$))×100≤30     (1').

2. A reagent suitable for use in detecting a target substance in a specimen by in vitro diagnosis, comprising the affinity particle according to claim 1.

3. A kit suitable for use in detecting a target substance in a specimen by in vitro diagnosis, comprising at least the reagent according to claim 2.

4. A method for detecting a target substance in a specimen by in vitro diagnosis, comprising mixing the reagent according to claim 2 with the specimen that possibly contains the target substance.

5. The affinity particle according to claim 1, wherein the side chain A and the side chain B have the partial structure represented by formula (2):

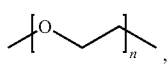
(2)

wherein n is an integer.

6. The affinity particle according to claim 1, wherein the particle further comprises a polymer having a unit having a side chain C having a hydroxyl group at a terminal.

7. The affinity particle according to claim 6, wherein the hydroxyl group is on the surface of the particle.

8. The affinity particle according to claim 6, wherein the unit having the side chain C is a chemical structure of any of formulae (3) to (6):

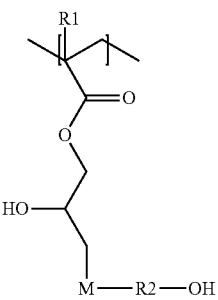
(3)

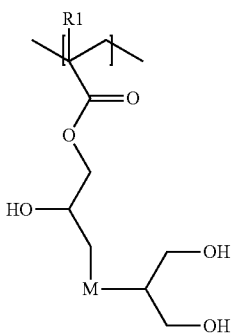
(4)

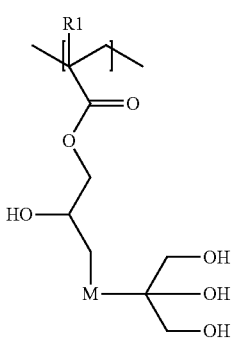
(5)

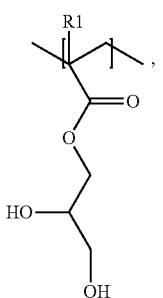
(6)

wherein M represents NH or S; and R1 represents H or CH$_3$, and R2 represents an alkyl group.

9. The affinity particle according to claim 1, wherein the carboxyl group that the side chain A has at the terminal thereof is neutralized by an organic salt.

10. The affinity particle according to claim 1, wherein the particle comprises a repeating unit of a styrene-based monomer.

11. The affinity particle according to claim 1, wherein L4 and L4' is at least one chemical structure independently selected from the group consisting of chemical structures represented by formulas (L4-1), (L4-2), and (L4-3):

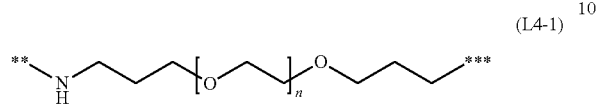

(L4-1)

(L4-2)

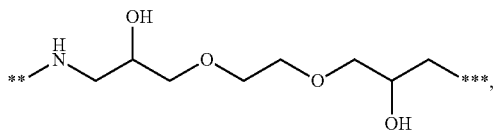

(L4-3)

wherein:
** represents bonding to a carbon atom;
*** represents bonding to a nitrogen atom;
n is an integer 1 or 2; and
m is an integer of 1 to 6.

12. The affinity particle according to claim 1, wherein the ligand is an antigen or an antibody.

13. The affinity particle according to claim 1, wherein the affinity particle is a particle suitable for an agglutination method.

* * * * *